US009923837B2

(12) United States Patent
Zhang et al.

(10) Patent No.: US 9,923,837 B2
(45) Date of Patent: Mar. 20, 2018

(54) METHOD AND SYSTEM TO ALLOCATE BANDWIDTH BASED ON TASK DEADLINE IN CLOUD COMPUTING NETWORKS

(71) Applicant: ERICSSON AB, Stockholm (SE)

(72) Inventors: Ying Zhang, Fremont, CA (US); Dan Li, Beijing (CN); Jing Zhu, Beijing (CN); Congjie Chen, Beijing (CN)

(73) Assignee: ERICSSON AB, Stockholm (SE)

( * ) Notice: Subject to any disclaimer, the term of this patent is extended or adjusted under 35 U.S.C. 154(b) by 783 days.

(21) Appl. No.: 14/014,151

(22) Filed: Aug. 29, 2013

(65) Prior Publication Data

US 2015/0067170 A1 Mar. 5, 2015

(51) Int. Cl.
| | |
|---|---|
| *G06F 15/173* | (2006.01) |
| *H04L 12/911* | (2013.01) |
| *H04L 12/24* | (2006.01) |
| *H04L 12/26* | (2006.01) |
| *G06F 9/50* | (2006.01) |

(52) U.S. Cl.
CPC .......... *H04L 47/70* (2013.01); *G06F 9/5072* (2013.01); *H04L 41/5051* (2013.01); *H04L 43/0876* (2013.01); *H04L 41/5096* (2013.01)

(58) Field of Classification Search
CPC ... H04L 12/911; H04L 43/0876; H04L 47/70; H04L 41/5051; H04L 41/5096; G06F 9/5072
USPC .............................................. 709/226; 718/1
See application file for complete search history.

(56) References Cited

U.S. PATENT DOCUMENTS

| | | | | |
|---|---|---|---|---|
| 7,936,675 | B2 * | 5/2011 | Bailey ................. | H04L 12/5695 370/229 |
| 8,341,624 | B1 * | 12/2012 | Hobbs .................. | H04N 19/152 709/204 |
| 8,370,495 | B2 * | 2/2013 | Jackson ............... | G06F 9/5027 709/226 |

(Continued)

OTHER PUBLICATIONS

Vora, Dhairya et al., "Allocation of Slotted Deadline Sensitive Leases in Infrasructure Cloud", Nov. 13, 2012, pp. 242-252, Distributed Computing and Internet Technology.*

(Continued)

*Primary Examiner* — Joseph E Avellino
*Assistant Examiner* — Binod J Kunwar
(74) *Attorney, Agent, or Firm* — Nicholson De Vos Webster & Elliott LLP

(57) ABSTRACT

A method implemented to provide a virtual network to tenants requiring bandwidth in a cloud computing environment is disclosed. The method starts with receiving a request for a task at a network device, the request including a first parameter indicating VMs required, a second parameter indicating bandwidths the required VMs need, a third parameter indicating a duration of the task, and a fourth parameter indicating a deadline of the task. The network device then selects a starting time and a bandwidth allocation of the task, where the bandwidth allocation is shrank to be smaller than the second parameter indicating, and where the selection aims at minimizing a measurement of cloud resource utilization considering consumptions of both VMs and bandwidth. Then the network device allocates VMs for the request at the starting time with the bandwidth allocated at a particular location in the cloud computing environment.

18 Claims, 8 Drawing Sheets

(56) References Cited

U.S. PATENT DOCUMENTS

| | | | | |
|---|---|---|---|---|
| 8,418,185 | B2* | 4/2013 | Durham | G06F 9/5077 709/201 |
| 8,434,084 | B2* | 4/2013 | Ferdous | G06F 9/5044 709/203 |
| 8,547,840 | B1* | 10/2013 | Kumar | H04L 43/0894 370/231 |
| 8,739,170 | B1* | 5/2014 | Gupta | G06F 9/54 718/104 |
| 8,938,541 | B2* | 1/2015 | Zhang | 709/224 |
| 9,065,734 | B2* | 6/2015 | Zhang | H04L 41/0806 |
| 9,170,849 | B2* | 10/2015 | Calder | G06F 9/5072 |
| 9,189,283 | B2* | 11/2015 | Larson | G06F 9/5044 |
| 9,792,145 | B1* | 10/2017 | Henry | G06F 9/45558 |
| 2001/0038639 | A1* | 11/2001 | McKinnon, III | H04L 12/2801 370/468 |
| 2003/0235209 | A1* | 12/2003 | Garg | H04L 12/4675 370/468 |
| 2004/0100903 | A1* | 5/2004 | Han | H04L 12/5695 370/230 |
| 2004/0205206 | A1* | 10/2004 | Naik | H04L 29/06 709/230 |
| 2008/0163228 | A1* | 7/2008 | Murata | G06F 9/505 718/103 |
| 2008/0189716 | A1* | 8/2008 | Nakahara | G06F 21/608 718/105 |
| 2008/0244588 | A1* | 10/2008 | Leiserson | G06F 9/4881 718/102 |
| 2009/0037926 | A1* | 2/2009 | Dinda | G06F 9/4887 718/107 |
| 2010/0023949 | A1* | 1/2010 | Jackson | G06F 9/5027 718/104 |
| 2010/0153945 | A1* | 6/2010 | Bansal | G06F 9/4881 718/1 |
| 2010/0322074 | A1* | 12/2010 | Nakahira | H04L 12/5695 370/235 |
| 2010/0333113 | A1* | 12/2010 | Johnson | G06F 9/4881 719/318 |
| 2011/0078679 | A1* | 3/2011 | Bozek | G06F 9/455 718/1 |
| 2011/0145392 | A1* | 6/2011 | Dawson | G06F 9/5072 709/224 |
| 2011/0255404 | A1* | 10/2011 | Kafka | H04L 41/0896 370/232 |
| 2011/0292792 | A1* | 12/2011 | Zuo | H04L 47/20 370/230 |
| 2012/0198046 | A1* | 8/2012 | Shah | G06Q 30/04 709/224 |
| 2013/0014101 | A1* | 1/2013 | Ballani | H04L 67/101 718/1 |
| 2013/0031545 | A1* | 1/2013 | Choudhury | G06F 9/45558 718/1 |
| 2013/0219068 | A1* | 8/2013 | Ballani | G06F 9/5061 709/226 |
| 2013/0254768 | A1* | 9/2013 | Wipfel | H04L 9/3213 718/1 |
| 2013/0275975 | A1* | 10/2013 | Masuda | G06F 9/5077 718/1 |
| 2014/0143425 | A1* | 5/2014 | Tabbara | G06Q 30/06 709/226 |
| 2014/0297864 | A1* | 10/2014 | Zhang | H04L 41/0896 709/226 |
| 2014/0325068 | A1* | 10/2014 | Assuncao | H04L 41/082 709/226 |
| 2014/0372614 | A1* | 12/2014 | Tan | H04L 47/805 709/226 |
| 2014/0380304 | A1* | 12/2014 | Salehi | G06F 9/45558 718/1 |
| 2015/0074278 | A1* | 3/2015 | Maes | H04L 47/70 709/226 |
| 2015/0244640 | A1* | 8/2015 | Ponsford | H04L 47/70 709/226 |

OTHER PUBLICATIONS

Ballani, Hitesh, et al., "Towards Predictable Datacenter Networks", SIGCOMM' 11 Aug. 2011, 12 pages, Toronto, Ontario, Canada.

Ballani, Hitesh, et al., "The Price Is Right: Towards Location-Independent Costs in Datacenters", Nov. 14-15, 2011, 6 pages, Cambridge, MA, USA.

Crowcroft, Jon, et al., "Differentiated End-to-End Internet Services using a Weighed Proportional Fair Sharing TCP", Jun. 30, 1998, 17 pages.

Guo, Chuanxiong, et al., "SecondNet: A Data Center Network Virtualization Architecture with Bandwidth Guarantees", Nov. 30-Dec. 3, 2010, 12 pages, 2010, Philadelphia, USA.

Pan, Rong, et al., "QCN: Quantized Congestion Notification", 2007, 26 pages.

Shieh, Alan, et al., "Sharing the Data Center Network", 2011, 14 pages.

Xie, Di, et al., "The Only Constant is Change: Incorporating Time-Varying Network Reservations in Data Centers", SIGCOMM'12, Aug. 13-17, 2012, 12 pages, Helsinki, Finland.

Zhang, Ying, A Method and System to Allocate Bandwidth for Heterogeneous Bandwidth Request in Cloud Computing Networks, corresponding to U.S. Appl. No. 13/851,694, filed Mar. 27, 2013, 40 pages.

Zhang, Ying, et al., "A Method and System to Allocate Bandwidth in Cloud Computing Networks", corresponding to U.S. Appl. No. 13/663,416, filed Oct. 29, 2012, 33 pages.

Zhang, Ying, "Network Bandwidth Allocation in Multi-Tenancy Cloud Computing Networks", corresponding to U.S. Appl. No. 13/791,316, filed Mar. 8, 2013, 35 pages.

S. Kent, et al., "Security Architecture for the Internet Protocol," Dec. 2005, 101 pages, Network Working Group, Request for Comments: 4301, The Internet Society.

R. Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.

Hatzopoulos, Dimitris et al., "Dynamic Virtual Machine Allocation in Cloud Server Facility Systems with Renewable Energy Sources", Jun. 9, 2013, pp. 4217-4221, 2013 IEEE International Conference on Communications (ICC).

Vora, Dhairya et al., "Allocation of Slotted Deadline Sensitive Leases in Infrastructure Cloud", Nov. 13, 2012, pp. 242-252, Distributed Computing and Internet Technology.

Zhu, Jing et al., "Towards Bandwidth Guarantee in Multi-tenancy Cloud Computing Networks", Oct. 30, 2012, 10 pages, 2012 20th IEEE International Conference on Network Protocols (ICNP).

* cited by examiner

FIG. 6

Algorithm 1: DCloud resource allocation algorithm.

1 DCloudAlloc($J'$, $R$)
   Input: $J' = <n, b, \hat{p}, d>$; relaxed resource request;
   $R$: existing time-varying RUR;
   $R_{o,t}$: utilized resource for server/link $o$ at time $t$.
   Output: $R$: updated time-varying RUR.
2  $U \leftarrow <\infty, \infty, \infty>$;
3  for $t'$ in $0$ to $d - \hat{p}$ step $\frac{d-\hat{p}}{10}$ do
4    for $b'$ in $b$ to $\frac{b \times \hat{p}}{d-t'}$ step $\frac{b \times (d-t'-\hat{p})}{10 \times (d-t')}$ do
5      $p' \leftarrow \frac{\hat{p} \times b}{b'}$;
6      $Y' \leftarrow <n, b', t', p'>$;
7      if $Place(Y', R) = True$ then
8        $U' \leftarrow <u_1, u_2, u_3>$; /*network's DRU*/
9        if $U' < U$ then
10         $U \leftarrow U'$;
11         $Y \leftarrow Y'$;
12       end
13     end
14   end
15 end
16 $R \leftarrow$ updated time-varying RUR with $Y$;

17 Place($Y'$, $R$)
   Input: $Y' = <n, b', t', p'>$; reshaped resource request;
   $R$: existing RUR.
   Output: $True$ if successfully allocated, $False$ otherwise.
18 foreach server or link $o$ in the cloud do
19   $V_o \leftarrow \min_{t \in [t', t'+p']} (R_{o,t})$; /*turning RUR to RUS*/
20 end
21 return VCalloc($n, b', V$);

US 9,923,837 B2

METHOD AND SYSTEM TO ALLOCATE BANDWIDTH BASED ON TASK DEADLINE IN CLOUD COMPUTING NETWORKS

FIELD OF INVENTION

The embodiments of the invention are related to the field of networking. More specifically, the embodiments of the invention relate to a method and system of allocating bandwidth in a cloud computing environment.

BACKGROUND

Cloud computing has transformed the way applications are created and run in recent years. It employs the Infrastructure as a Service (IaaS) model in which customers outsource their computing and software capabilities to third party infrastructures and pay for the service usage on demand. Compared to the traditional computing model that uses dedicated, in-house infrastructures, cloud computing provides many advantages, including economies of scale, dynamic provisioning, and low capital expenditures. It allows customers to establish and rapidly expand a global presence in minutes rather than days or months, with the "pay-as-you-go" charging model.

The proliferation of virtualization technologies and rich Internet connectivity have brought an explosive growth in cloud computing. Tenants outsource their computation and storage to public cloud providers, and pay for the service usage on demand. This model offers unprecedented advantages in terms of cost and reliability, compared with traditional computing model that uses dedicated, in-house infrastructure. However, despite the tremendous momentums it grows, the future viability of cloud computing still depends on its offered performance and associated costs.

There have been some efforts to effectively allocate bandwidth in a cloud computing environment. Yet mechanisms proposed so far do not sufficiently explore a known deadline of a task to allocate bandwidth to the task, which will usually result in sub-optimal performance and resource utilization.

SUMMARY

A method implemented to provide a virtual network to tenants requiring bandwidth in a cloud computing environment is disclosed. The virtual network includes virtual switches that manage servers that host virtual machines (VMs), and the method starts with receiving a request for a task at a network device, the request including a first parameter indicating VMs required, a second parameter indicating bandwidths the required VMs need, a third parameter indicating a duration of the task (which can be an estimate in some embodiment), and a fourth parameter indicating a deadline of the task. The network device then selects a starting time of the task and a bandwidth allocation of the task, where the bandwidth allocation of the task is shrank to be smaller than the second parameter indicating, and where the selection aims at minimizing a measurement of cloud resource utilization considering consumptions of both VMs and bandwidth. Then the network device allocates VMs for the request at the starting time with the bandwidth allocated at a particular location in the cloud computing environment such that the task can be completed prior to the deadline.

A network device for providing a virtual network to tenants requiring bandwidth in a cloud computing environment is disclosed. The virtual network includes virtual switches that manage servers that host virtual machines (VMs), and the network device includes a user interface configured to receive a request for a task, the request including a first parameter indicating VMs required, a second parameter indicating bandwidths the required VMs need, a third parameter indicating a duration of the task (which can be an estimate in some embodiment), and a fourth parameter indicating a deadline of the task. The network device also includes a resource allocator that aims at maximizing the overall cloud resource utilization, called resource utilization processor. The resource utilization processor includes a starting time and bandwidth selector configured to select a starting time of the task and a bandwidth allocation of the task, where the bandwidth allocation of the task is shrank to be smaller than the second parameter indicating, and where the selection aims at minimizing a measurement of cloud resource utilization considering consumptions of both VMs and bandwidth. The resource utilization processor also includes a VM allocator configured to allocate VMs for the request at the starting time with the bandwidth allocated at a particular location in the cloud computing environment such that the task can be completed prior to the deadline.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this specification are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 6 is a pseudo code illustrating a resource allocation procedure by a DCloud provider according to one embodiment of the invention.

DETAILED DESCRIPTION

Figure 1:
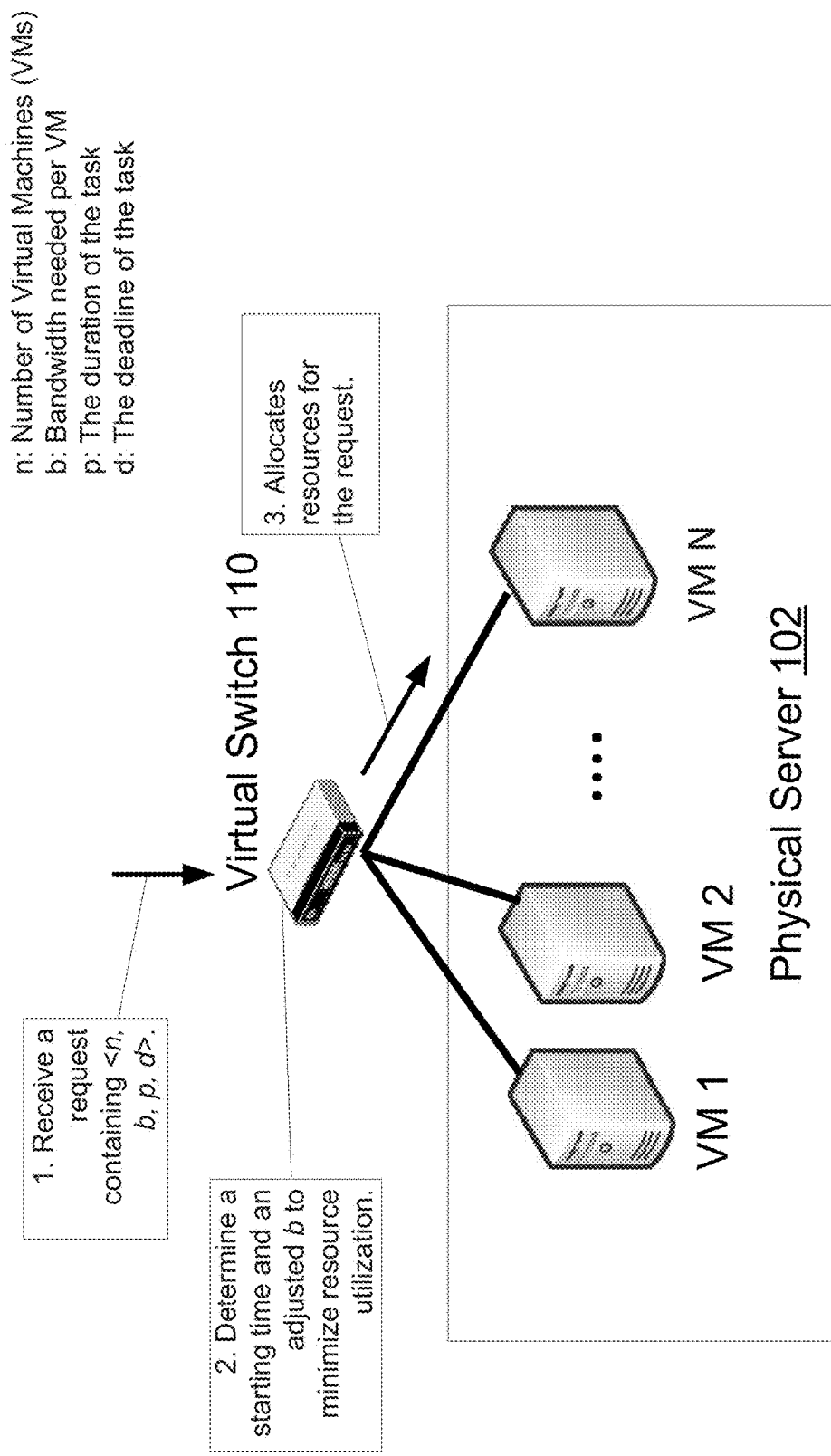
FIG. 1 is a block diagram illustrating one embodiment of a network configuration and its associated operations.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network device (e.g., a router or a switch) is a piece of networking equipment, including hardware and software that communicatively interconnects other equipment on the network (e.g., other network devices, end systems). Some network devices are "multiple services network devices" that provide support for multiple networking functions (e.g., routing, bridging, VLAN (virtual LAN) switching, Layer 2 aggregation, session border control, Quality of Service, and/or subscriber management), and/or provide support for multiple application services (e.g., data, voice, and video). Subscriber end systems (e.g., servers, workstations, laptops, netbooks, palm tops, mobile phones, smartphones, multimedia phones, Voice Over Internet Protocol (VoIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end systems (e.g., server end systems) belonging to a service or content provider or end systems participating in a peer to peer service, and may include, for example, public webpages (e.g., free content, store fronts, search services), private webpages (e.g., username/password accessed webpages providing email services), and/or corporate networks over VPNs. Typically, subscriber end systems are coupled (e.g., through customer premise equipment coupled to an access network (wired or wirelessly)) to edge network devices, which are coupled (e.g., through one or more core network devices) to other edge network devices, which are coupled to other end systems (e.g., server end systems). A network device is generally identified by its media access (MAC) address, Internet protocol (IP) address/subnet, network sockets/ports, and/or upper OSI layer identifiers.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Objectives of Resource Allocation in Cloud Computing & Existing Solutions

In order to improve performance and reduce cost for cloud computing, a cloud computing model should the following requirement. First, the performance for running an application in the cloud should be predictable. Computation result beyond the tenant's expected deadline may become useless, for applications such as weather forecast, stock analysis, etc. Second, the cloud resource should be efficiently utilized, which allows more tenants being accepted with the same amount of resource and thus bring higher revenue to the cloud provider. Third, from the tenant's perspective, the cost should depend on the task's characteristics alone, so as to be predictable.

In the current practice of IaaS (infrastructure as a service) cloud computing, a tenant may specify the number (type) of virtual machines (VMs) needed and gets charged based on the duration of VM occupation. Although such model achieves efficient utilization of the cloud resource by assigning VMs into available servers and letting tenants share bandwidth in a best-effort manner, it fails to meet the other two requirements above. On the one hand, it leaves tenants the risks of unpredictably low performance due to insufficient bandwidth. On the other hand, the unpredictable bandwidth a tenant gets also affects the duration-based cost the tenant pays, and thus strategic tenants can open more TCP connections to get higher bandwidth and accordingly pay less.

In contrast, allocation based mechanisms abstract a bandwidth request model for a tenant, assign VMs of the tenant into proper locations of the network to meet the bandwidth requirement, and use rate limiters at hypervisors to enforce the bandwidth reservation and isolation. Though allocation based mechanisms may fail to make full utilization of the network resource, it provides predictable network performance for a tenant without concern of other competing tenants.

Recently there are proposals to overcome the deficiencies of IaaS cloud computing model. Some proposals aim to provide guaranteed bandwidth and thus predictable application performance, some others try to improve the resource utilization by adapting the number of VMs and the associated bandwidth to serve a tenant's request, while some others focus on charging tenants in a more reasonable way. Yet, none of them are sufficient to meet all the design requirements.

Traditional fair queuing and congestion control methods proposed may cause tenant unfairness and are prone to malicious attacks. While recently proposed contention based bandwidth sharing mechanisms consider tenant fairness, they do not specify the tenant's bandwidth demand, and thus may not meet the bandwidth requirement of tenants.

Some recent proposals target bandwidth resource allocation based on the tenants' demands. For example, a proposal abstracts the bandwidth demand as the bandwidth matrix among VMs, which is difficult to be specified before computation is carried on. Another proposal uses a hose model to abstract the tenant's bandwidth request, which is more practical but it only considers homogeneous bandwidth request for all the VMs within a tenant.

In addition, a set of proposals seeks to provide predictable application performance by guaranteed bandwidth, which contains models generally referred to as bandwidth guaranteed models (BGMs). In this set of proposals, a tenant specifies both the number of VMs and associated bandwidth of each VM. Cloud provider guarantees tenant's bandwidth requirement when allocating the VMs into appropriate servers with rate limiters, by which the application performance is predictable. New allocation algorithms considering different factors have also been proposed. However, they do not solve the fundamental shortcoming of BGMs, i.e., the overall low resource utilization. The basic reason is that, the relationship between the number of VMs and associated bandwidth is specified by tenants, which may not well match the corresponding type of available resource in the cloud.

Task Deadline Based Bandwidth Allocation

Embodiments of the invention include a new interface between tenants and provider for cloud computing, and the new interface is referred to as DCloud. The insight of a DCloud model is that the expected deadline for a task in a cloud computing environment can play a key role in guaranteeing application performance, efficiently utilizing cloud resource, as well as providing task-based charging. The cloud computing environment may obtain the deadline related information through the through the interface. That is, when submitting a resource request, each tenant may specify not only the number of VMs and associated bandwidth, but also the referenced task running duration and the task deadline. The time interval between the task running duration and the task deadline leaves room for reshaping the resource request.

FIG. 1 is a block diagram illustrating one embodiment of a network configuration and its associated operations. In a cloud computing environment, tenants can be subscriber end stations, e.g., servers, workstations, laptops, netbooks, palm tops, mobile phones, smartphones, multimedia phones, Voice Over Internet Protocol (VOIP) phones, user equipment, terminals, portable media players, GPS units, gaming systems, or set-top boxes. These tenants run software applications that require bandwidth. A network service provider (or cloud provider) offers virtual network services to tenants by assigning tenants inter-connecting virtual machines (VMs). Note the terms network service provider and cloud provider are used interchangeably within the specification. Tenants do not need to be aware of the underlying physical infrastructure, but only to concern if the high-level service level agreements (SLAs) can be met. To this end, each tenant can specify her requirement of the network service in terms of topology connectivity, security policy, required bandwidth, and etc. to a virtual switch, which is a device managing and connecting VMs in a cloud computing environment.

Referring to FIG. 1, a request for a task is received at virtual switch 110 at task box 1. The request is described as a 4-tuple J=<n, b, p, d> in DCloud. The first two parameters n and b are the numbers of VMs and the bandwidth needed per VM respectively. Note that b can be varied across different VMs and/or over time. While the homogeneous bandwidth request is used for illustration, the embodiment of the invention may be utilized to accommodate heterogeneous bandwidth requests. The last two parameters are the referenced task running duration, p, and the task deadline, d. Naturally a tenant has the expected latest time for the task to finish, after which the result may not be usable. In one embodiment, d is calculated based on the interval between the current time and the expected latest time, while p is be obtained by profiling the application with a small sample input. In one embodiment, d is an estimate of the time duration of the task. Note the request may be issued directly from a tenant, or it may be converted from a tenant request and then relayed to virtual switch 100.

Then at task box 2, virtual switch 110 determines a feasible starting time and an adjusted bandwidth allocation based on b. The determination is based on criteria to minimize resource utilization at the cloud computing environment. Assuming that virtual switch 110 determines it can accommodate the request, it proceeds to allocate VMs on physical server 102 at task box 3. Note that even though virtual switch 110 is depicted as a separate device, it can be integrated within a physical server. For example, a hypervisor, also called a virtual machine manager (VMM), which manages concurrent virtual machine sessions of a physical server, may contain the functionality of a virtual switch. In this specification, physical server and server are used interchangeably.

Although the operations above are not overly sophisticated, many challenges exist, particularly at determining the feasible starting time and the adjustable bandwidth allocation. Algorithms have been developed to exploit the time interval, using time sliding to smooth the peak demand and bandwidth shrinking to balance the usage of VM and bandwidth resource, with the guarantee of task being completed before deadline. Embodiments of the invention employ a number of mechanisms and algorithms, including:

A bandwidth shrinking algorithm to count for inaccuracy of submitted task duration;

An inversely proportional rule is imposed to conservatively estimate the task running duration after bandwidth shrinking, without requiring knowing the application semantics; and A new metric, called dominant resource utilization, is proposed to perform joint optimization of different types of cloud resource when allocating the resource to tenants.

Request Transformation

According to one embodiment of the invention, when receiving a task request $J=<n, b, p, d>$ from a tenant (or another network device), DCloud provider reshapes it to $Y=<n, b', t', p'>$ to better fit into the available cloud resource. Here b' denotes the shrunk VM bandwidth based on the original bandwidth request b, t' is the interval between the submitting time and launching time of the task, and p' is the new task running duration under b'. Y should satisfy $t'+p' \leq d$ to meet the task's deadline requirement. The assumption is that n is determined by the application semantics and cannot be arbitrarily set.

DCloud provider may take two steps to reshape the tenant's resource request:

(1). In order to mask a possible profile error (where the tenant underestimates the task running duration), p is relaxed to: $\tilde{p}=\min((1+\gamma) \times p, d)$, where $\gamma$ is called the profiling relax index. The relaxation of p to $\tilde{p}$ helps ensure the task completion if p is underestimated in profiling, since the cloud resource beyond the expected task finish time will be reserved for other task. However, $\tilde{p}$ should not be larger than d. Note that the conservatively reserved resource can be released to serve other tasks immediately after the target task is completed.

(2). The cloud provider uses time sliding and bandwidth shrinking to reshape the relaxed tuple $J'=<n, b, \tilde{p}, d>$ to $Y=<n, b', t', p'>$. Time sliding decides the launching time of the task, t', while bandwidth shrinking determines the actual bandwidth, b', assigned to each VM.

The major benefit of time sliding is to smooth out the peak demand of the cloud, and thus reduce the number of rejected tenants at busy time. If the gap between the task duration and the deadline is long enough, we could even shift some day-time tasks to be run at night time, given the diurnal pattern of cloud loads. Sliding the task launching time balances the utilization of cloud resource over time, which not only provides successful cloud service to more tenants at peak time, but also increases the cloud resource utilization at valley time.

The purpose of introducing bandwidth shrinking, i.e., adjusting bandwidth request b in J' to a smaller b' in Y, is to balance the utilization of VM and network resource in the cloud, as inter-VM network resource is found to be the performance bottleneck for typical cloud applications. One challenge here is to estimate the adjusted task running duration p' after shrinking the bandwidth. To make the resource allocation algorithm geneic, we assume that the cloud provider has no knowledge about the application semantics, and thus we have to make the estimation based on the input parameters in resource request $J'=<n, b, \tilde{p}, d>$ alone.

Estimating Adjusted Task Duration

In order to analyze adjusted task duration, one may divide all tasks into two categories. One is a category of tasks that the tasks' computation bottleneck with bandwidth b is in the network, thus there is an inversely proportional relationship between p' and the shrunk bandwidth b', i.e., $p'=\tilde{p} \times b$. The other is a category of tasks that the tasks' computation bottleneck with bandwidth b is in the VM's local resources, e.g., CPU, local disk, where $p' \leq \tilde{p} \times b$, as the reduced bandwidth may not inversely affect the task running duration b'.

Figure 2:
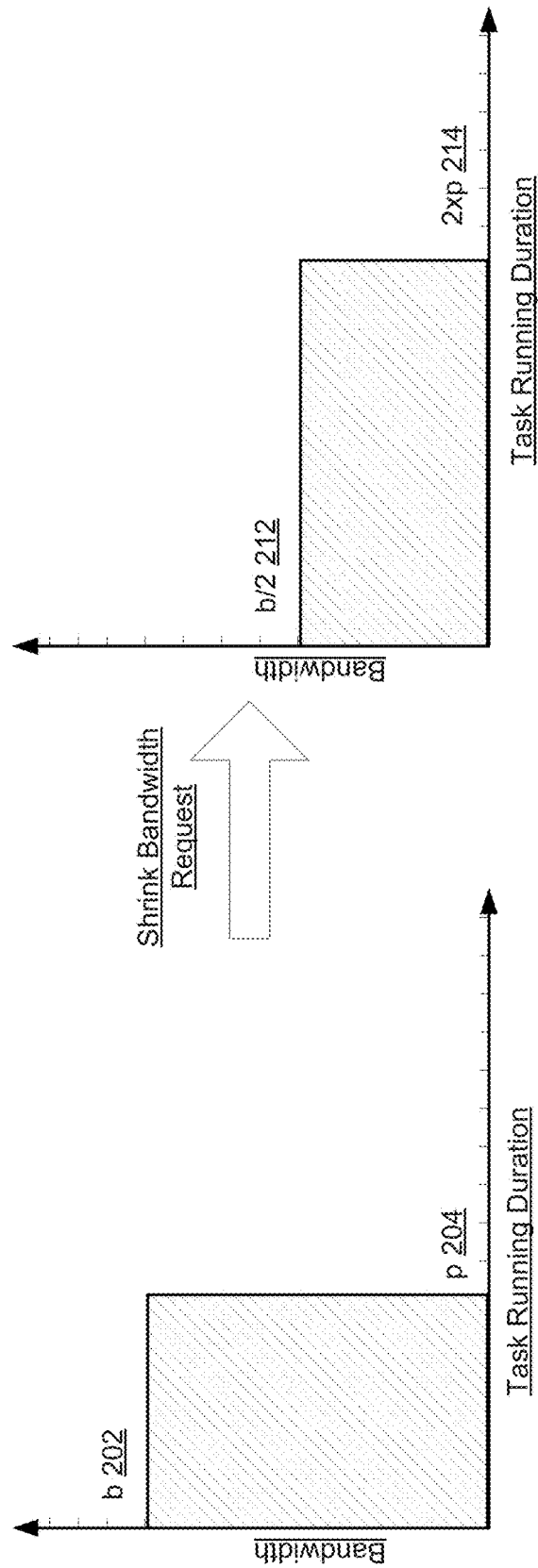
FIGS. 2A-B illustrate the category of tasks where the tasks' computation bottleneck with bandwidth b is in the network according to one embodiment of the invention.

FIGS. 2A-B illustrate the category of tasks where the tasks' computation bottleneck with bandwidth b is in the network according to one embodiment of the invention. Referring to FIG. 2A, the task running duration is p at reference 204, and the task requests bandwidth of b at reference 202. The requested bandwidth is shrunk by half by a DCloud provider. FIG. 2B illustrates the shrunk bandwidth request and adjusted task running duration. As shown, the bandwidth request is reduced to b/2 at reference 212. Because the task's computation bottleneck with bandwidth b is in the network, an inversely proportional relationship between bandwidth and task running duration exists, and the task running duration is doubled. Note for the task where the computation bottleneck with bandwidth b is in the VM's local resources, the task running duration will be prolonged less than double when the bandwidth is halved, and $p' \leq \tilde{p} \times b$ is satisfied.

Consequently, one may always conservatively estimate the new task running duration as $p'=\tilde{p} \times b$ for the shrunk bandwidth b. Note that if the task finishes earlier than the expected time because of the conservative estimation, the reserved resource may be immediately released to serve subsequent tasks.

Figure 3:
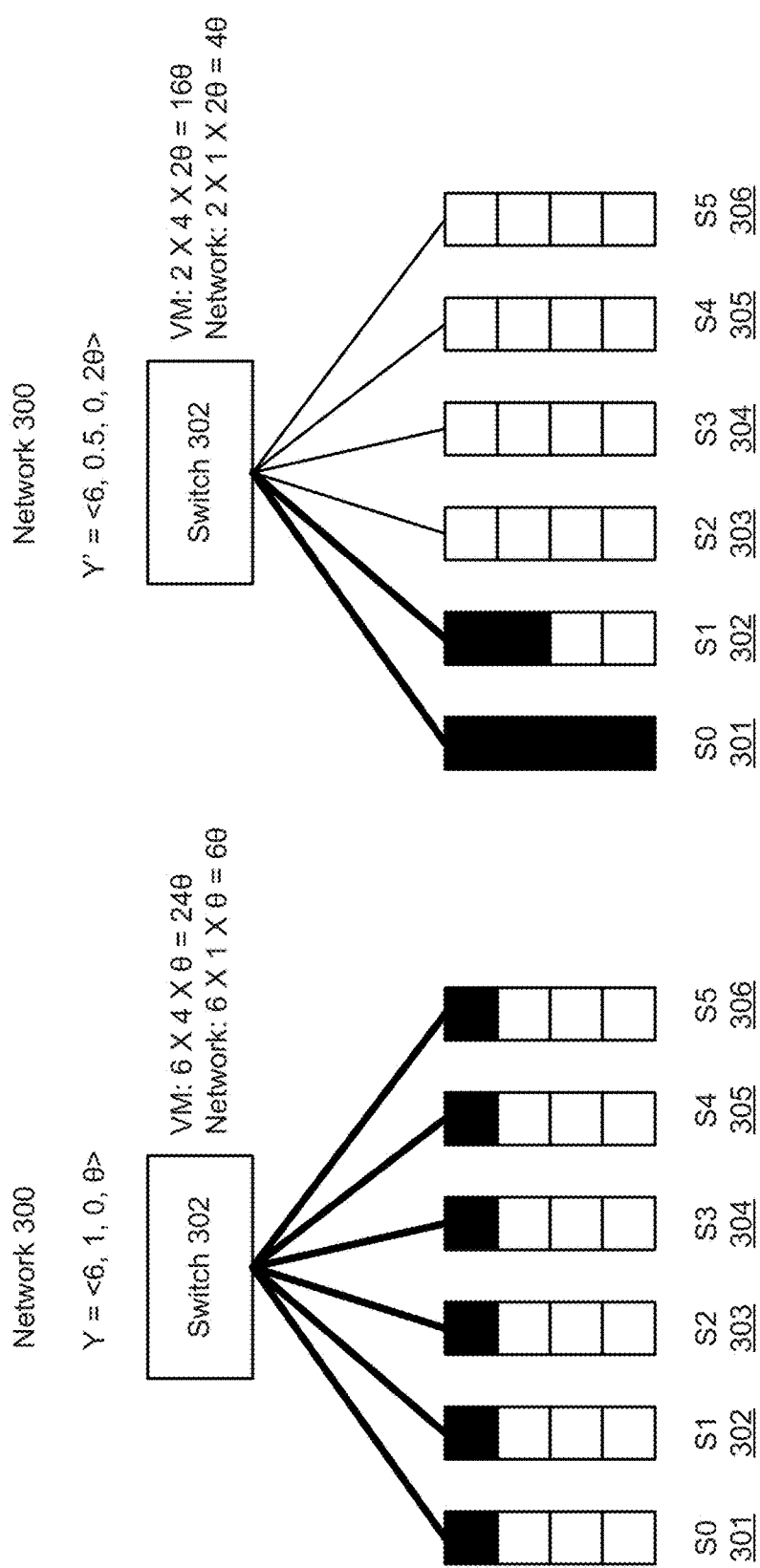
FIGS. 3A-B illustrate the benefit of allocating VMs in a more localized way according to one embodiment of the invention.

Bandwidth shrinking benefits efficient utilization of the cloud resource in the following two aspects. First, intuitively, it allows acceptance of more tenants, when the available bandwidth in the cloud is not sufficient to meet a tenant's original bandwidth demand while the VM slots are plenty. Second, bandwidth shrinking can help allocate VMs in a more localized way. Assigning VMs of one tenant to physically close-by servers can help reduce the total bandwidth consumption in the network Benefits of Bandwidth Shrinking FIGS. 3A-B illustrate the benefit of allocating VMs in a more localized way according to one embodiment of the invention. Network 300 of a cloud provider illustrated in FIGS. 3A-B contains a switch (switches 302) and six servers (S0 to S6 at references 301-306), each of which contains 4 VM slots and the bandwidth of each server is 1 unit. At FIG. 3A, a task request J is reshaped to $Y=<6, 1, 0, 0>$. As shown, the task requires 6 VMs distributed evenly to six servers as one VM needs 1 unit of bandwidth and that fully occupies the bandwidth of a server to switch 302. With the allocation, the request consumes 6 (VMs)×4 (slots per VM)×θ (task duration)=24θ VM time, which is a measurement of VM consumption. Similarly, the request consumes 6 (links)×1 (bandwidth unit)×θ (task duration)=6θ bandwidth time, which is a measurement of bandwidth consumption.

At FIG. 3B, the reshaped task request Y is further processed to have its bandwidth request shrunk in half, and the request is changed to Y'=<6, 0.5, 0, 2θ>. With the bandwidth shrinking, as discussed herein above, the task duration is conservatively estimated to be 2θ. Since now the requested bandwidth is reduced, now the bandwidth can be locally allocated as shown, where S0 301 now has all four slots taken and S1 302 has two slots taken. Note the bandwidth required for the request is only one unit, because the S2, the side of smaller bandwidth consumption needs only 1 unit. With the allocation, the VM time consumed by the request is 2 (VMs)×4 (slots per VM)×2θ (task duration)=16θ VM time, and the bandwidth time consumed is 2 (links)×1 (bandwidth unit)×2θ (task duration)=4θ bandwidth time.

Comparing to FIG. 3A, the allocation of FIG. 3B reduces resource consumption (both VM time and bandwidth time) by one third. Thus, shrinking bandwidth request may achieve better resource consumption in some circumstances. However, one needs to avoid over-shrinking bandwidth request where the shrinking causes lower utilization of network resources.

Note bandwidth request expansion (versus shrinking) is not considered in reshaping the tenants' requests. The rationale is that, since most cloud tasks are limited by network bandwidth request, bandwidth expansion will make the resource utilization more imbalanced. Moreover, when reserving the VM and bandwidth resources, one cannot guarantee a shorter task running duration after expanding the bandwidth without knowledge of the application details. Consequently, bandwidth expansion may not be helpful in utilizing the cloud resource in a more efficient way.

Dominant Resource Utilization

While the benefits of time sliding and bandwidth shrinking have been demonstrated herein above, it is challenging to determine the best t' and b' to use in the adjusted request of a task, Y. Most proposed allocation algorithms consider optimizing for a single resource, e.g., the balanced bandwidth utilization. Here the embodiments of the invention consider two different types of cloud resource, namely, the VM slots (including CPU, memory, and local disk for VM slots) and the link bandwidth, together.

The proposed metric is dominant resource utilization (DRU), which captures the impact on the cloud resources if accepting the new request, depending on its more stringent resource types. DRU can be used in a variety of network topologies, such as tree, fat tree, and Clos network. For illustration, we assume a tree topology is used in the cloud network.

Figure 4:
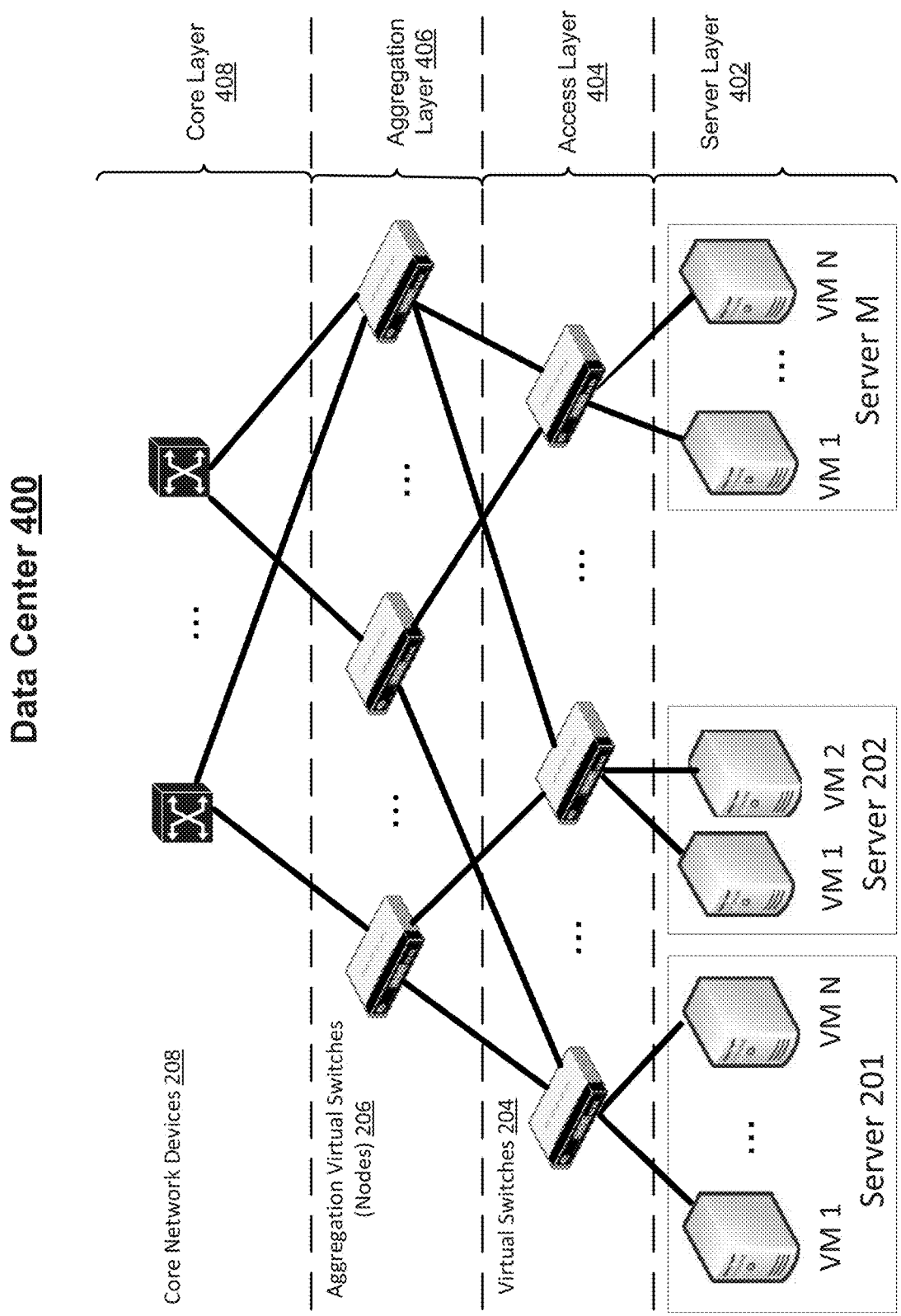
FIG. 4 illustrates a four layer cloud network.

A tree topology in a cloud network may be logically defined in multiple layers (sometimes referred to as multi-tiers). FIG. 4 illustrates a four layer cloud network. The cloud network 400 is a data center. The top tier is core layer 408, which contains core network devices 208. Core layer 408 provides a fabric for high-speed packet switching between multiple aggregation modules. This layer serves as the gateway to the campus core where other modules connect, including, for example, the extranet, WAN, and Internet edge. All links connecting the data center core are terminated at OSI Layer 3 and typically use 10 or higher GigE interfaces for supporting a high level of throughput, performance, and to meet oversubscription levels.

The next tier is aggregation layer 406, which has many access layer uplinks connected to it, has the primary responsibility of aggregating traffic from the edge layer. The aggregation switches is able to support many high-speed interconnects while providing a high-speed switching fabric with a high forwarding rate. The aggregation layer also provides value-added services, such as server load balancing, firewalling, and SSL offloading to the servers across the access layer switches. Aggregation layer 406 may contain multiple aggregation virtual switches 206. The aggregation virtual switches 206 are sometimes referred to as nodes, and nodes may have multiple tiers of their own.

The next tier down is access layer 404, which provides the physical level attachment to the server resources, and operates in Layer 2 or Layer 3 modes. Access layer contains virtual switches 204, which determines resource allocation at server resources of the bottom tier server layer 402. Virtual switches 204, similar to aggregation virtual switches 206, sometimes are referred to as nodes. Sever layer 402 contains severs such as severs 201-M, and each servers may contain multiple VMs.

The embodiment of the invention applies to multi-tier topology such as data center 400. It may also apply to multi-class topology where one class may take a higher priority to have better resource utilization than another, thus a resource utilization strategy may optimize at one class first and then go to the next, lower priority class.

For a multi-tier topology, a DRU can be recursively defined nodes as the follows. For a server i, we assume it has $m_i$ VM slots in total, and there are already $m'_{i,t}$ slots occupied at time t. These occupied VMs consume $z'_{i,t}$ bandwidth out of the $z_i$ total link capacity of the server. The DRU of the server at time t is then shown in Equation 1, which takes the maximum from the utilization of VM resource (the first field) and the utilization of bandwidth resource (the second field).

$$u_{i,t} = \max\left(\frac{m'_{i,t}}{m_i}, \frac{z'_{i,t}}{z_i}\right) \quad (1)$$

For a switch i, we assume that the set of all its children nodes is $C_i$, and the DRU for a child node $j \in C_i$ at time t is $u'_{j,t}$. The outbound link capacity of switch i is $z_i$, among which $z'_{i,t}$ bandwidth has been utilized at time t. Shown in Equation 2, the DRU of switch i at time t is either its outbound link bandwidth utilization or its children's average DRU, whichever is larger.

$$u_{i,t} = \max\left(\frac{\sum_{j \in C_i} u_{j,t}}{|C_i|}, \frac{z'_{i,t}}{z_i}\right) \quad (2)$$

After defining the DRU for a node each time instance, the DRU of the node is the integral over time, as illustrated by Equation 3.

$$u_i = \int_{t=0}^{\infty} u_{i,t} \quad (3)$$

Note that the DRU for a node may be either aggregation layer or access layer, depending on implementation. Based on the definition, the larger a node's DRU is, the more difficult it is to accept subsequent tenant requests within the subtree rooting from the node. When defining the DRU of a network containing all nodes, we take the network oversubscription in typical tree topology into account. Since higher-level nodes and links in the tree are more easy to become congested, one may separate three types of network's DRU, i.e., aggregation layer DRU (denoted as $u_1$), access layer DRU (denoted as $u_2$), and server layer DRU (denoted as $u_3$), which are the sum of the DRUs of all the aggregation layer switches, access layer switches, and servers in server layers respectively. In one embodiment, the core layer devices are not taken into consideration, because its DRU is just the aggregation layer DRU divided by the number of aggregation switches. The DRU of a cloud network (such as data center 400 of FIG. 4), U, is then defined as the tuple of $U=<u_1, u_2, u_3>$. The value of U is larger if a former variable in the tuple is larger.

Using network 300 of FIGS. 3A-B as an example, one may calculate DRUs as the following. At FIG. 3A, without any bandwidth shrinking, the DRU of each server $S_i$ ($0 \le i < 6$) is $U_{si} = \int_{t=0}^{\theta} \max(0.25, 1) = \theta$, hence the DRU of the switch 302 is also $u_w = \max((\Sigma_{i=0}^{5} u_{si}/6, 0)) = \theta$. For FIG. 3B, we have $U_{s0} = \int_{t=0}^{2 \times \theta} \max(1, 1) = 2 \times \theta$, and $U_{s1} = \int_{t=0}^{2 \times \theta} \max(0.5, 1) = 2 \times \theta$, and $u_{si} = 0$ ($2 \le i < 6$). Hence the DRU of the switch 302 is $u_w = \max((\Sigma_{i=0}^{5} u_{si}/6, 0)) = 2/3 \times \theta$. Since the DRU of the other parts of the network are not affected by the resource allocation under switch 302, the DRU of the network with b'=0.5 is smaller than that with b'=1, hence b'=1 is a better choice to reshape the request.

Allocation Algorithm

Based on DRU, a DCloud provider may find which allocation is more efficient. Thus, an important step is to select the t' and b' that can minimize the DRU of a network for a given request. Previously proposed resource allocation algorithms assign VMs and bandwidth for a task request based on the instantaneous resource utilization state (RUS), for which we use the function VCalloc(n,b,V) to denote, where V denotes the instantaneous RUS.

In a DCloud model, the DCloud provider needs to determine the launching time of tasks as well, thus a new abstraction called time-varying resource utilization record (RUR), R, to maintain the VM utilization for servers and bandwidth utilization for links over time.

Figure 5A:
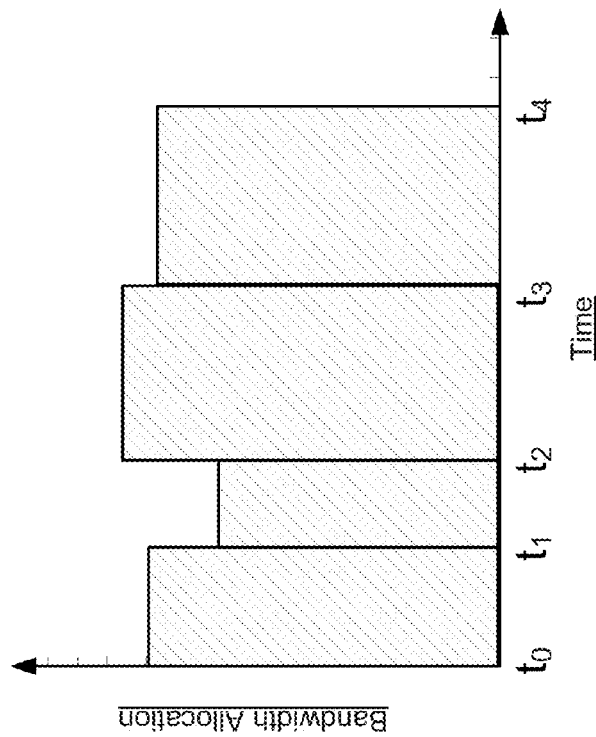
FIGS. 5A-B illustrate the time-varying RUR for a server and a link respectively.
Figure 5B:
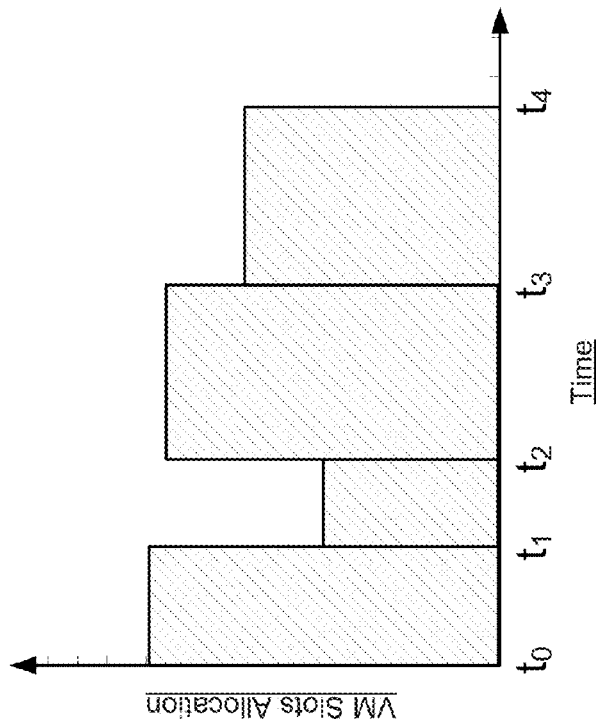

FIGS. 5A-B illustrate the time-varying RUR for a server and a link respectively. The bar chart may be updated when a task is allocated and when the task is finished at or before the expected ending time.

FIG. 6 is a pseudo code illustrating a resource allocation procedure by a DCloud provider according to one embodiment of the invention. The pseudo code takes J' and R as input and outputs $R_{o, t}$ at reference 602. J' is a relaxed resource request, where $J'=<n, b, \tilde{p}, d>$ as discussed herein above. R is the existing time-varying RUR and $R_{o,t}$ is the resource allocation for a sever or a link o at time t determined by the procedure.

In the procedure, the continuous search space for t' and b' is separated into discrete bins. The procedure starts by enumerating the possible starting time t', which can be any value from the request submission time (t'=0), till the last starting time that the task can finish right at its deadline. The values are separated in this range into x bins, where x is a configurable value (x=10 is used at reference 604). Similarly, the range for bandwidth shrinking is from its requested value b, to the smallest value by which the task running duration will be prolonged to right before the deadline. This range is also separated into bins (10 bins are used at reference 606). Among all the options, the best allocation that minimizes DRU of the DCloud network is found through steps at reference 608.

When assigning VM and bandwidth with a given b' and t', the procedure assigns VM and bandwidth by translating the time-varying resource tracked in RUR (R) to the instantaneous resource in RUS (V). It can be done by taking the minimum available resource during the time interval of [t', t'+p'] for servers and links as illustrated at reference 610. Note VCalloc(n,b,V) is used to assign the VMs and link bandwidth at reference 612. After choosing the b' and t' that can minimize the DRU of the DCloud network, R is updated by adding the reserved VM slots and bandwidth from t' to t'+p' to the corresponding servers and links at reference 614. When a task finishes at t"<t'+p', the resource reserved at the corresponding servers and links in the time interval of [t", t'+p'] are released to serve subsequent pending tasks.

Embodiments of Task Deadline Based Bandwidth Allocation

Figure 7:
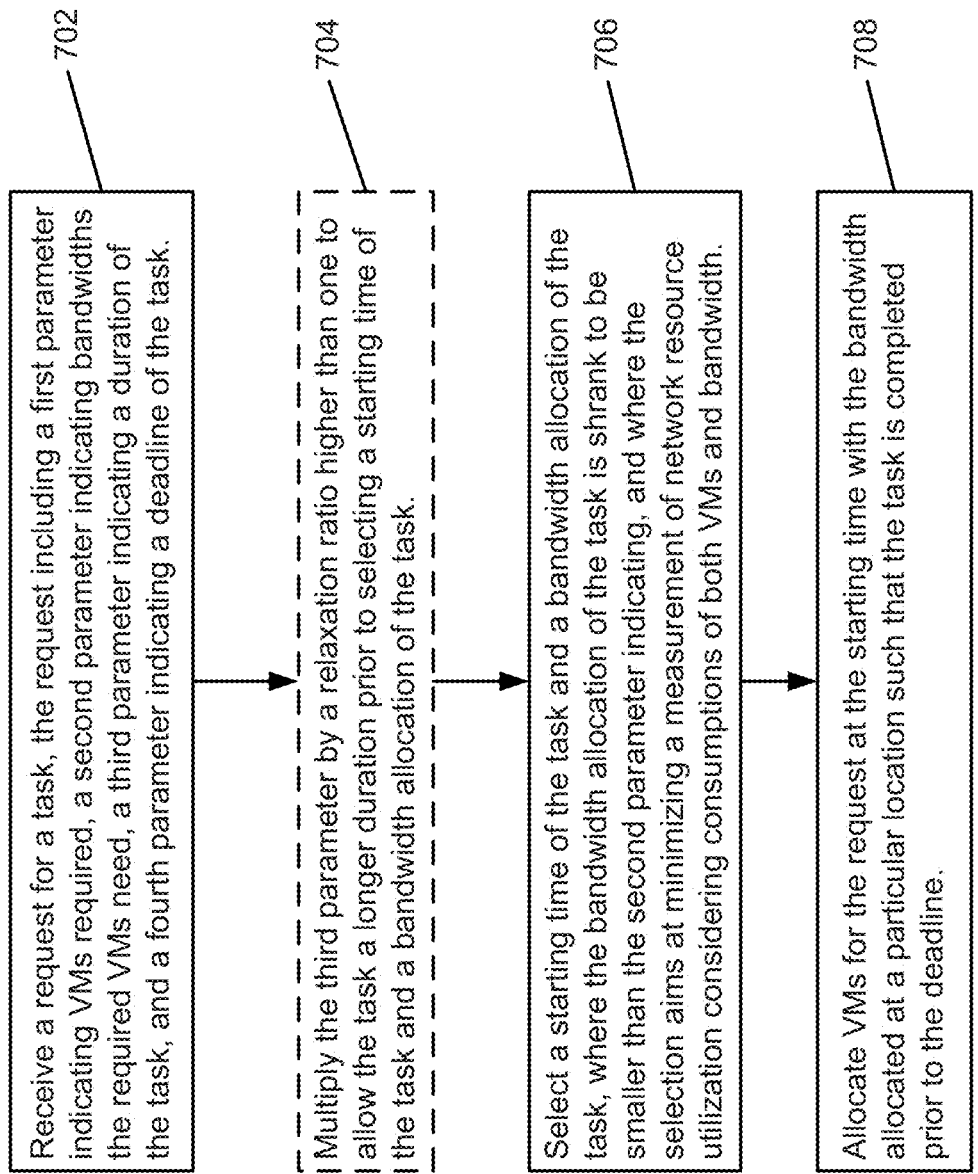
FIG. 7 is a flow diagram illustrating the process of allocating bandwidth based on task deadline according to one embodiment of the invention.

FIG. 7 is a flow diagram illustrating the process of allocating bandwidth based on task deadline according to one embodiment of the invention. Process 700 can be implemented in a cloud computing environment and it can be used to provide a virtual network (containing virtual switches managing servers that host virtual machines) to tenants requiring bandwidth.

Process 700 starts at a network device receiving a request for a task at reference 702, where the request includes a first parameter indicating a number of VM required, a second parameter indicating bandwidths each required VM need, a third parameter indicating a duration of the task, and a fourth parameter indicating a deadline of the task. Note the duration of the task may be an estimate in one embodiment. The network device may be a virtual switch in one embodiment. The request may come from a tenant directly, or it may come from another network device at the upper level or a peer network device, where a tenant request is converted to a set of different variables allocating to various network devices within the cloud computing environment. Note the four parameters may be given at a different order and the order itself is not essential to embodiments of the invention. Also, in one embodiment, all the VMs require a same amount of bandwidth.

At reference 704, the network device may optionally multiply the third parameter by a relaxation ratio higher than one to allow the task a longer duration as given to provide certain leeway for underestimated task durations.

Then at reference 706, the network device selects a starting time of the task and allocates bandwidth for the task. The bandwidth allocation of the task is shrank to be smaller than the second parameter indicating to achieve better resource utilization, and the selection of the starting time and bandwidth allocation is aimed at minimizing a defined measurement of cloud resource utilization considering consumption of both VMs and bandwidth. The shrinking results in extending the given third parameter inversely proportional to the shrinking of bandwidth allocation. The defined measurement is the dominant resource utilization (DRU) discussed herein above. The selection of the starting time and bandwidth allocation is based on comparing DRUs of a set of starting time and a set of bandwidth allocation. In other words, the DRU is computed not at continuous basis for all feasible starting time and bandwidth allocation. Rather, DRUs of a discrete set of selection of starting time and bandwidth allocation are compared to make the selection.

The network device then allocate VMs for the request at the selected starting time with the bandwidth allocated at a particular location in the cloud computing environment such that the task is completed prior to the deadline of the task at reference 708. The allocation is illustrated in FIG. 6. In one embodiment, the allocation is performed by calculating allocation ranges (ARs) associated to the virtual switches, see for example U.S. patent application Ser. No. 13/663,416, entitled "Method and System to Allocate Bandwidth in Cloud Computing Networks," filed on Oct. 29, 2012, U.S. patent application Ser. No. 13/851,694, entitled "A Method and System to Allocate Bandwidth for Hetergeneous Bandwidth Request in Cloud Computing Networks," filed on Mar. 27, 2013, incorporated by reference herein.

Note that the defined measurement of cloud resource utilization contains a plurality of elements in one embodiment, and each element represents a tier of cloud resource utilization. For example, the plurality of elements includes a first element of a set of servers hosting the VMs of the cloud computing environment, a second element of a set of virtual switches managing the set of servers, and a third element of a set of nodes managing the set of servers. Also, when the procedure does not yield a viable bandwidth allocation, the network device will send an error indication to alert the failure.

Network Devices Implementing Task Deadline Based Bandwidth Allocation

Figure 8:
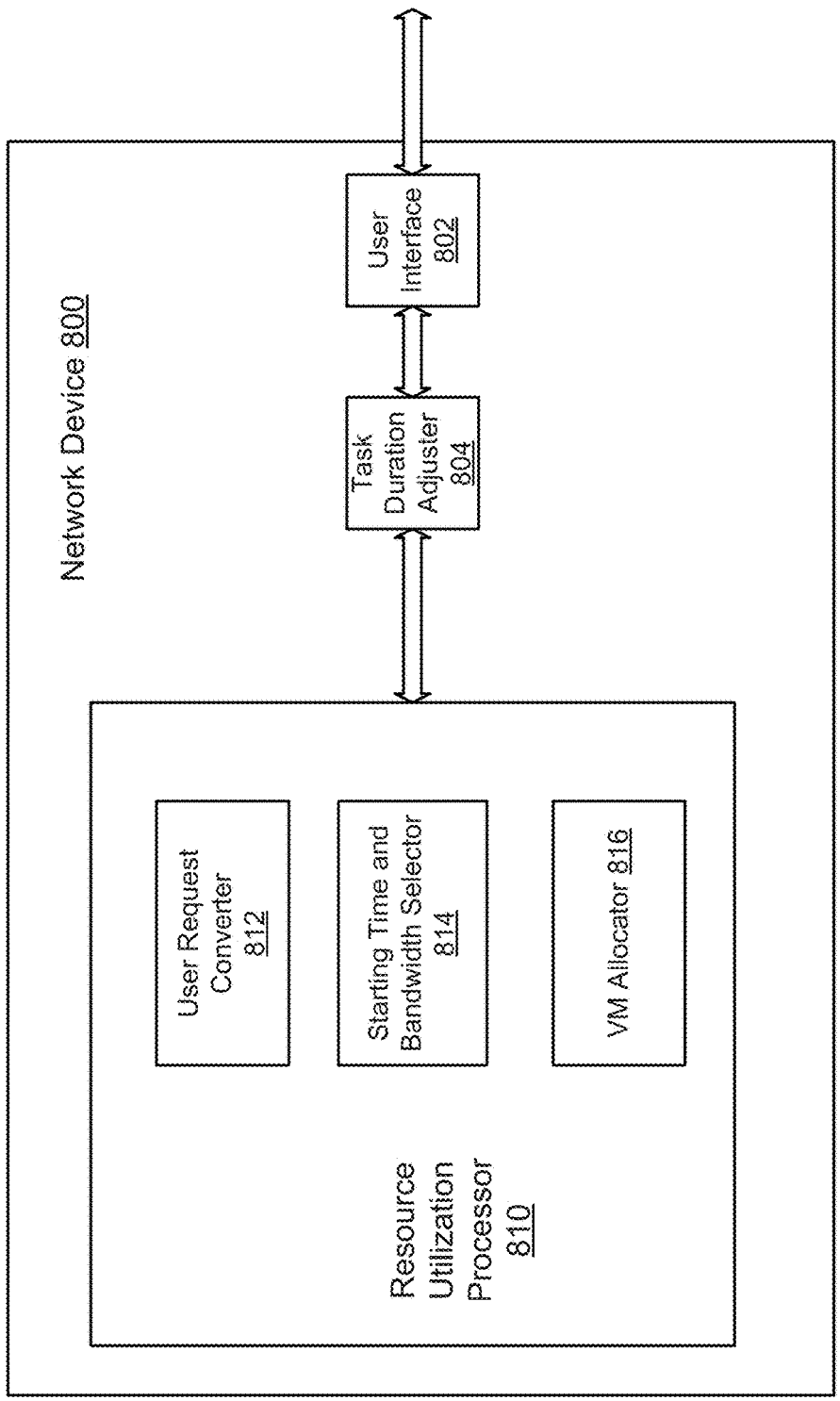
FIG. 8 is a block diagram illustrating a network device containing a processor implementing a method of task deadline based bandwidth allocation according to one embodiment of the invention.

FIG. 8 is a block diagram illustrating a network device containing a processor implementing a method of task deadline based bandwidth allocation according to one embodiment of the invention. Network device 800 is installed within a cloud computing environment such as a data center. It may be a virtual switch or a controller coupled to a virtual switch, which determines the allocation of bandwidth and starting time of tasks.

Network device 800 contains a user interface 802 configured to accept task requests and send out success or failure indication of tasks requests. The task requests may be sent out by a tenant directly or it may be converted from a tenant request. In one embodiment, the task request and associated parameters are inferred from an agreement such as service level agreement (SLA) between the tenant and the cloud computing provider. A task request sent to user interface 802 contains a first parameter indicating a number of VM required, a second parameter indicating bandwidths each required VM need, a third parameter indicating a duration of the task, and a fourth parameter indicating a deadline of the task.

Task duration adjuster 804 is coupled to user interface 802, and it receives a task request forwarded by user interface 802. Task duration adjuster 804 adjusts the requested task duration by multiplying the third parameter by a relaxation ratio higher than one to allow the task a longer duration as given to provide certain leeway for underestimated task durations.

Resource utilization processor 810 determinations resource utilization and allocation. It is coupled to task duration adjuster 804 and receive the adjusted task request in one embodiment. In another embodiment, resource utilization processor 810 is coupled directly to user interface 802 without going through task duration adjustment.

Resource utilization processor 810 may contain user request converter 812, starting time and bandwidth selector 814, and virtual machine (VM) allocator 816. These various modules are interconnected through one or more interconnect. Note that various modules can be implemented as a single unit or multiple units, the unit or units integrate various modules and perform similar function as the modules of resource utilization processor 810, and these modules can be implemented in software, hardware or a combination thereof. Some modules illustrated in FIG. 8 may be implemented outside of resource utilization processor 810 but communicatively coupled with resource utilization processor 810. In addition, some modules outside of resource utilization processor 810 may be implemented within resource utilization processor 810 in one embodiment.

In one embodiment, resource utilization processor 810 is configured to make resource allocation based on the deadline of a task. Starting time and bandwidth selector 814 is configured to select a starting time of the task and a bandwidth allocation of the task, where the bandwidth allocation of the task is shrank to be smaller than the second parameter indicating, and where the selection aims at minimizing a measurement of cloud resource utilization considering consumptions of both VMs and bandwidth. The shrinking results in extending the given third parameter inversely proportional to the shrinking of bandwidth allocation. The defined measurement is dominant resource utilization (DRU) discussed herein above. The selection of the starting time and bandwidth allocation is based on comparing DRUs of a set of starting time and a set of bandwidth allocation. In other words, the DRU is computed not at continuous basis for all feasible starting time and bandwidth allocation. Rather, DRUs of a discrete set of selection of starting time and bandwidth allocation are compared to make the selection.

VM allocator 816 then allocates VMs for the request at the starting time with the bandwidth allocated at a particular location in the cloud computing environment such that the task is completed prior to the deadline.

Note the operations of the flow diagrams in FIG. 7 are described with reference to the exemplary embodiment of FIG. 8. However, it should be understood that the operations of flow diagrams can be performed by embodiments of the invention other than those discussed with reference to FIG. 7, and the embodiments discussed with reference to FIG. 8 can perform operations different than those discussed with reference to the flow diagrams of FIG. 7.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end system, a network device, or a cloud centralized management system at a data center). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented to provide a virtual network to tenants requiring bandwidth in a cloud computing environment, wherein the virtual network includes virtual switches that manage servers that host virtual machines (VMs), the method comprising:
receiving, at a network device in the cloud computing environment, a request for a task, the request including a first parameter indicating a number of VMs required, a second parameter indicating bandwidths the required VMs need, a third parameter indicating a duration of the task, and a fourth parameter indicating a deadline of the task;
updating a value of the third parameter by increasing the value of the third parameters to allow the task a longer duration within the deadline of the task;
selecting a starting time of the task and a bandwidth allocation of the task based on values of the first, second, third, and fourth parameters after the updating, wherein the bandwidth allocation of the task sets a bandwidth allocated to the task to be smaller than a value of the second parameter indicated by the request, and wherein the selection aims at minimizing a measurement of cloud resource utilization considering consumptions of both VMs and allocated bandwidth; and
allocating the number of VMs for the request at the starting time with the bandwidth allocated at a particular location in the cloud computing environment such that the task is completed prior to the deadline.

2. The method of claim 1, wherein the values of the first parameter, the second parameter, the third parameter, and the fourth parameter are converted from a bandwidth request by a tenant.

3. The method of claim 1, wherein all the required VMs need a same bandwidth.

4. The method of claim 1, wherein the measurement of cloud resource utilization contains a plurality of elements, each element represents a tier of cloud resource utilization.

5. The method of claim 4, wherein the plurality of elements includes a first element of a set of servers hosting the VMs, a second element of a set of virtual switches managing the set of servers, and a third element of a set of nodes managing the set of servers.

6. The method of claim 1, wherein selecting the starting time of the task and the bandwidth allocation of the task includes comparing measurements of cloud resource utilization at a set of starting time and a set of bandwidth allocation.

7. The method of claim 1, wherein selecting the starting time of the task and the bandwidth allocation of the task includes increasing the value of the third parameter inversely proportional to the shrinking of bandwidth allocation of the task from the second parameter indicating bandwidth required.

8. The method of claim 1, further comprising sending an error indication if allocating VMs for the request is not feasible to complete execution prior to the deadline.

9. A network device to provide a virtual network to a tenant requiring bandwidth in a cloud computing environment, wherein the virtual network includes virtual switches that manage servers that host virtual machines (VMs), the network device comprising:
a user interface configured to receive a request for a task, the request including a first parameter indicating a number of VMs required, a second parameter indicating bandwidths the required VMs need, a third parameter indicating a duration of the task, and a fourth parameter indicating a deadline of the task; and
a processor configured to:
update a value of the third parameter by increasing the value of the third parameters to allow the task a longer duration within the deadline of the task,
select a starting time of the task and a bandwidth allocation of the task based on values of the first, second, third, and fourth parameters after the update, wherein the bandwidth allocation of the task is to set a bandwidth allocated to the task to be smaller than a value of the second parameter indicated by the request, and wherein the selection aims at minimizing a measurement of cloud resource utilization considering consumptions of both VMs and allocated bandwidth, and
allocate the number of VMs for the request at the starting time with the bandwidth allocated at a particular location in the cloud computing environment such that the task is completed prior to the deadline.

10. The network device of claim 9, wherein the resource utilization processor further comprising:
a user request converter configured to convert a bandwidth request by a tenant to values of the first parameter, the second parameter, the third parameter, and the fourth parameter.

11. The network device of claim 9, wherein all the required VMs need a same bandwidth.

12. The network device of claim 9, wherein the measurement of cloud resource utilization contains a plurality of elements, each element represents a tier of cloud resource utilization.

13. The network device of claim 12, wherein the plurality of elements includes a first element of a set of servers hosting the VMs, a second element of a set of virtual switches managing the set of servers, and a third element of a set of nodes managing the set of servers.

14. The network device of claim 9, wherein selecting the starting time of the task and the bandwidth allocation of the task includes comparing measurements of cloud resource utilization at a set of starting time and a set of bandwidth allocation.

15. The network device of claim 9, wherein selecting the starting time of the task and the bandwidth allocation of the task includes increasing the value of the third parameter inversely proportional to the shrinking of bandwidth allocation of the task from the second parameter indicating bandwidth required.

16. The network device of claim 9, wherein the user interface is further configured to send an error indication if allocating VMs for the request is not feasible to complete execution prior to the deadline.

17. A method implemented to provide a virtual network to tenants requiring bandwidth in a cloud computing environment, wherein the virtual network includes virtual switches that manage servers that host virtual machines (VMs), the method comprising:
receiving, at a network device in the cloud computing environment, a request for a task, the request including a first parameter indicating a number of VMs required, a second parameter indicating bandwidths the required VMs need, a third parameter indicating a duration of the task, and a fourth parameter indicating a deadline of the task, wherein the first parameter, the second parameter, the third parameter, and the fourth parameter are converted from a bandwidth request by a tenant;

updating a value of the third parameter by increasing the value of the third parameters to allow the task a longer duration within the deadline of the task;

selecting the starting time of the task and the bandwidth allocation of the task based on values of the first, second, third, and fourth parameters after the updating, wherein the bandwidth allocation of the task sets a bandwidth allocated to the task to be smaller than a value of the second parameter indicating, and wherein the selection aims at minimizing a measurement of cloud resource utilization considering consumptions of both VMs and allocated bandwidth, wherein the measurement of cloud resource utilization contains a plurality of elements and each element represents a tier of cloud resource utilization, wherein the plurality of elements includes a first element for a set of servers hosting the VMs, a second element for a set of virtual switches managing the set of servers, and a third element for a set of nodes managing the set of servers, and wherein selecting the starting time of the task and the bandwidth allocation of the task includes extending the third parameter indicating the duration of the task inversely proportional to the shrinking of bandwidth allocation of the task from the second parameter indicating bandwidth required; and allocating the number of VMs for the request at the starting time with the bandwidth allocated at a particular location in the cloud computing environment such that the task is completed prior to the deadline.

18. A network device to provide a virtual network to a tenant requiring bandwidth in a cloud computing environment, wherein the virtual network includes virtual switches that manage servers that host virtual machines (VMs), the network device comprising:

a user interface configured to receive a request for a task, the request including a first parameter indicating a number of VMs required, a second parameter indicating bandwidths the required VMs need, a third parameter indicating a duration of the task, and a fourth parameter indicating a deadline of the task; and a processor configured to:
  convert a bandwidth request by a tenant to the first parameter, the second parameter, the third parameter, and the fourth parameter,
  update a value of the third parameter by increasing the value of the third parameters to allow the task a longer duration within the deadline of the task,
  select the starting time of the task and the bandwidth allocation of the task based on values of the first, second, third, and fourth parameters after the update, wherein the bandwidth allocation of the task is to set a bandwidth allocated to the task to be smaller than a value of the second parameter indicated by the request, wherein the selection aims at minimizing a measurement of cloud resource utilization considering consumptions of both VMs and allocated bandwidth, wherein the measurement of cloud resource utilization contains a plurality of elements and each element represents a tier of cloud resource utilization, wherein the plurality of elements includes a first element for a set of servers hosting the VMs, a second element for a set of virtual switches managing the set of servers, and a third element for a set of nodes managing the set of servers, and wherein selecting the starting time of the task and the bandwidth allocation of the task includes extending the third parameter indicating the duration of the task inversely proportional to the shrinking of bandwidth allocation of the task from the second parameter indicating bandwidth required; and
  allocate the number of VMs for the request at the starting time with the bandwidth allocated at a particular location in the cloud computing environment such that the task is completed prior to the deadline.

* * * * *